United States Patent
Aso et al.

(10) Patent No.: US 11,649,728 B2
(45) Date of Patent: May 16, 2023

(54) TURBINE DESIGNING AND MANUFACTURING METHOD

(71) Applicant: Mitsubishi Heavy Industries, Ltd., Tokyo (JP)

(72) Inventors: Takeshi Aso, Yokohama (JP); Hironori Tsukidate, Yokohama (JP); Atsushi Sano, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/461,060

(22) Filed: Aug. 30, 2021

(65) Prior Publication Data
US 2022/0098983 A1   Mar. 31, 2022

(30) Foreign Application Priority Data
Sep. 30, 2020   (JP) .............................. JP2020-165242

(51) Int. Cl.
*F01D 5/04* (2006.01)
*B23P 15/00* (2006.01)

(52) U.S. Cl.
CPC ................ *F01D 5/04* (2013.01); *B23P 15/00* (2013.01); *F05D 2230/00* (2013.01); *Y10T 29/4932* (2015.01)

(58) Field of Classification Search
CPC .............................. B23P 15/00; Y10T 29/4932
See application file for complete search history.

(56) References Cited

U.S. PATENT DOCUMENTS

| 2015/0013144 A1* | 1/2015 | Bush ....................... C22F 1/183 |
| | | 29/527.1 |
| 2015/0269490 A1* | 9/2015 | Stillinger ................. F02C 9/00 |
| | | 706/52 |

FOREIGN PATENT DOCUMENTS

| EP | 3421727 A1 * | 1/2019 | ........... F01D 25/243 |
| JP | 2004027926 A * | 1/2004 | ................ F02C 3/04 |
| JP | 2013-199680 A | 10/2013 | |
| WO | WO 2019/016352 A1 | 1/2019 | |

OTHER PUBLICATIONS

Japanese-language Office Action issued in Japanese Application No. 2020-165242 dated Jan. 24, 2023 with English translation (eight (8) pages).

* cited by examiner

*Primary Examiner* — Sarang Afzali
(74) *Attorney, Agent, or Firm* — Crowell & Moring LLP (57) ABSTRACT

In a turbine designing and manufacturing method attendant on a material change of a rotor disk of a turbine rotor, a temperature rise time ratio is determined which is a desired ratio of a temperature rise time of the temperature of the rotor disk from a first temperature to a second temperature after the material change to the temperature rise time before the material change. An inter-surface distance between surfaces on upstream and downstream sides of the rotor disk after the material change is determined, and a shape of the rotor disk after the material change is determined based on the inter-surface distance. The turbine is designed based on the determined shape of the rotor disk. After the material change in the shape determined in the designing process, the rotor disk and the turbine are manufactured based on the result of the designing process.

7 Claims, 7 Drawing Sheets

| | ELEMENT | FORMULA · SYMBOL | MATERIAL | | REMARKS |
|---|---|---|---|---|---|
| | | | BEFORE CHANGE | AFTER CHANGE | |
| 1 | MATERIAL | - | HIGH-Cr STEEL | Ni-BASED ALLOY | |
| 2 | WEIGHT RATIO | mr | 1.0 | 0.87 | |
| 3 | SPECIFIC HEAT RATIO | cr | 1.0 | 0.8 | DETERMINED BY PHYSICAL PROPERTY VALUES OF MATERIAL |
| 4 | THERMAL CONDUCTIVITY RATIO | kr | 1.0 | 0.6 | |
| 5 | SECTIONAL AREA RATIO | Sr | 1.0 | 1.0 | DEEMED AS NOT VARIED |
| 6 | INTER-SURFACE DISTANCE RATIO | Lr | 1.0 | 0.87 | DEEMED AS EQUAL TO WEIGHT RATIO |
| 7 | TEMPERATURE RISE TIME RATIO | tr | 1.0 | 1.0 | |

| | ELEMENT | FORMULA · SYMBOL | MATERIAL BEFORE CHANGE | AFTER CHANGE | REMARKS |
|---|---|---|---|---|---|
| 1 | MATERIAL | - | HIGH-Cr STEEL | Ni-BASED ALLOY | |
| 2 | WEIGHT RATIO | mr | 1.0 | 0.79 | |
| 3 | SPECIFIC HEAT RATIO | cr | 1.0 | 0.8 | DETERMINED BY PHYSICAL PROPERTY VALUES OF MATERIAL |
| 4 | THERMAL CONDUCTIVITY RATIO | kr | 1.0 | 0.6 | |
| 5 | SECTIONAL AREA RATIO | Sr | 1.0 | 1.0 | DEEMED AS NOT VARIED |
| 6 | INTER-SURFACE DISTANCE RATIO | Lr | 1.0 | 0.79 | DEEMED AS EQUAL TO WEIGHT RATIO |
| 7 | TEMPERATURE RISE TIME RATIO | tr | 1.0 | 0.8 | |
| 8 | LINEAR EXPANSION RATIO | αr | 1.0 | 1.2 | DETERMINED BY PHYSICAL PROPERTY VALUES OF MATERIAL |
| 9 | GAP RATIO | Dr | 1.0 | 1.0 | |

TURBINE DESIGNING AND MANUFACTURING METHOD

BACKGROUND OF THE INVENTION

1. Field of the Invention

The present invention relates to a turbine designing and manufacturing method.

2. Description of the Related Art

In recent years, it has been demanded to raise the temperature of a combustion gas for enhancing the efficiency of a gas turbine. When the temperature of the combustion gas rises, the part of the turbine exposed to the combustion gas, such as a turbine rotor, is liable to be deteriorated, and its life may be shortened.

As a method for restraining deterioration of the turbine rotor, there is a method of applying a material having excellent high-temperature strength to the turbine rotor (see, for example, JP-2013-199680-A).

PRIOR ART DOCUMENT

Patent Document

Patent Document 1: JP-2013-199680-A

In the case of changing the material applied to the turbine rotor, as in JP-2013-199680-A, thermal extension of the turbine rotor may be varied attendant on variations of physical property values of the material. Therefore, it is necessary to newly grasp the thermal extension of the turbine rotor after the material change, and to re-design the turbine. As a method for grasping thermal extension, in general, there is known a nonsteady finite element method (FEM) analysis. However, the nonsteady FEM analysis is long in the time required for one run, and the number of repetitions until design data satisfying the required items for the turbine is obtained is large. Therefore, much time and labor may be required for designing and manufacturing a turbine attendant on a material change.

The present invention has been made in consideration of the foregoing, and it is an object of the present invention to shorten the time required for designing and manufacturing a turbine attendant on a material change.

SUMMARY OF THE INVENTION

In order to achieve the above object, according to the present invention, there is provided a turbine designing method attendant on a material change of a rotor disk of a turbine rotor, in which, let a time required for a temperature of the rotor disk to reach from a first temperature to a second temperature at the time of starting of a turbine be temperature rise time, and let a distance between surfaces on an upstream side and a downstream side of the rotor disk be an inter-surface distance, then the turbine designing method includes: determining a temperature rise time ratio that is a desired ratio of the temperature rise time after the material change to the temperature rise time before the material change; determining the inter-surface distance after the material change on the basis of the determined temperature rise time ratio; determining a shape of the rotor disk after the material change on the basis of the determined inter-surface distance; and designing the turbine while reflecting the determined shape of the rotor disk on the turbine rotor.

According to the present invention, the time required for designing and manufacturing a turbine attendant on a material change can be shortened.

DESCRIPTION OF THE PREFERRED EMBODIMENTS

First Embodiment (Configuration)

1. Gas Turbine

Figure 1:
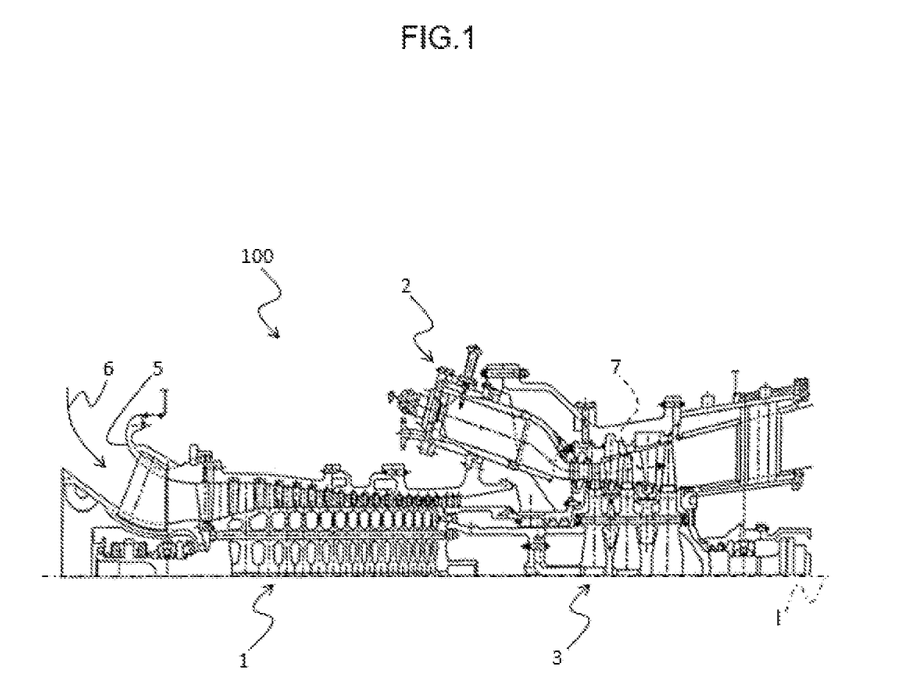
FIG. 1 is a diagram depicting a configuration example of a gas turbine to which a turbine according to a first embodiment of the present invention is applied.

FIG. 1 is a diagram depicting a configuration example of a gas turbine to which a turbine according to the present embodiment is applied. A case in which the turbine according to the present embodiment is applied to the gas turbine will be described below, but the object to which to apply the turbine according to the present embodiment is not limited, and, for example, the turbine may be applied to a steam turbine.

As illustrated in FIG. 1, a gas turbine 100 includes a compressor 1, a combustor 2, and a turbine 3. The compressor 1 and the turbine 3 are coupled to each other through a shaft (not illustrated). The compressor 1 is rotationally driven by the turbine 3, compresses air 6 taken in through an intake section 5 to produce high-pressure air (combustion air), and supplies the high-pressure air to the combustor 2. The combustor 2 mixes the high-pressure air supplied from the compressor 1 and a fuel supplied from a fuel system (not illustrated) to perform combustion, generating a high-temperature combustion gas 7 and supplying it to the turbine 3. The turbine 3 is rotationally driven by expansion of the combustion gas 7 supplied from the combustor 2. A load apparatus (not illustrated) is coupled to the turbine 3 or the compressor 1. In the present embodiment, a generator is coupled to the turbine 3 as a load apparatus, and power obtained by subtracting the power for driving the compressor 1 from the rotational power of the turbine 3 is converted into electric power by the generator. The combustion gas 7 having driven the turbine 3 is discharged as a turbine exhaust gas to the atmosphere.

2. Turbine

Figure 2:
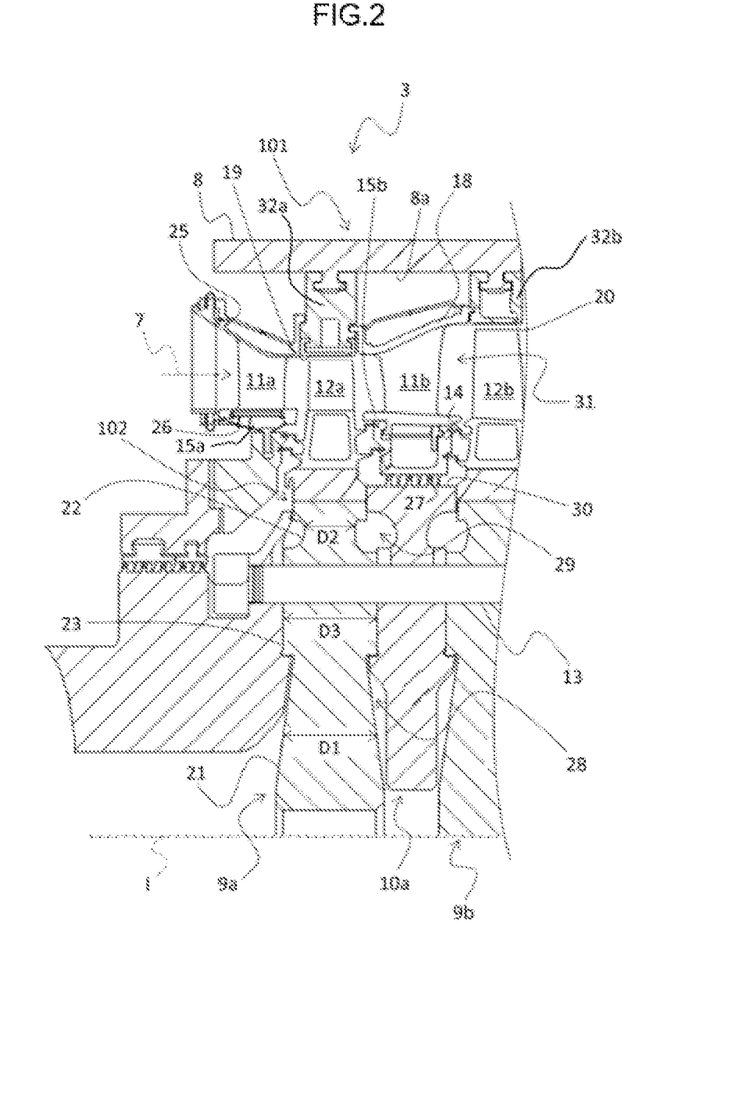
FIG. 2 is a sectional view depicting the internal structure of the turbine according to the first embodiment of the present invention.

FIG. 2 is a sectional view depicting the internal structure of a part of the turbine according to the present embodiment. As illustrated in FIG. 2, the turbine 3 includes a stationary body 101, and a turbine rotor 102 constituting a rotary body rotated relative to the stationary body 101.

The stationary body 101 includes mainly a casing 8, an outer ring 18, stationary vanes 11 (11a, 11b), an inner ring 15, a diaphragm 14, and shrouds 32 (32a, 32b).

The casing 8 is a cylindrical member forming a peripheral wall of the turbine 3. The outer ring 18, the stationary vanes 11 (11a, 11b), the inner ring 15, the diaphragm 14, and the turbine rotor 102 are accommodated in the casing 8.

An outer peripheral side end wall 18 is supported by an inner peripheral wall 8a of the casing 8 through the shroud 32 which will be described later. The outer peripheral side end wall 18 is a cylindrical member extending in the circumferential direction of the turbine rotor 102.

The plurality of stationary vanes 11b are provided on the inner peripheral surface of the outer peripheral side end wall 18 at regular intervals along the circumferential direction of the turbine rotor 102. The stationary vanes 11b extend from the inner peripheral surface of the outer peripheral side end wall 18 toward the radial directionally inner side of the turbine rotor 102. Hereinafter, the radial directionally inner side and the radial directionally outer side of the turbine rotor 102 will be referred to simply as "the radial directionally inner side" and "the radial directionally outer side." In addition, the stationary vanes 11b are arranged in a plurality of rows along an axial direction of the turbine rotor 102, and sets thereof with rotor vanes 12 constitute turbine stages. In the example of FIG. 1, first-stage stationary vanes 11a and second-stage stationary vanes 11b are depicted, but the number of the stages can be optional.

An inner peripheral side end wall 15b is provided on the radial directionally inner side of the stationary vanes 11b. The inner peripheral side end wall 15b is a cylindrical member extending in the circumferential direction of the turbine rotor 102. The stationary vanes 11b are connected to an outer peripheral surface of the inner peripheral side end wall 15b. In other words, the stationary vanes 11b are fixed between the outer peripheral side end wall 18 and the inner peripheral side end wall 15b. A space partitioned by the outer peripheral side end wall 18 and the inner peripheral side end wall 15b form a gas path as a flow channel of the combustion gas in the inside of the turbine 3.

The diaphragm 14 is attached to the inner peripheral surface side of the inner peripheral side end wall 15b, and extends in the circumferential direction of the turbine rotor 102. The diaphragm 14 is provided with fins (not illustrated) extending from an inner peripheral surface (a surface facing an outer peripheral surface 30 of a spacer disk 10a which will be described later) toward the radial directionally inner side. In addition, the shrouds 32 (32a, 32b) as members supporting the inner rings 18 of the stationary vanes 11 are fixed to the inner peripheral wall 8a of the casing 8. The shrouds 32 are annular members and are provided at positions facing the tip ends of the rotor vanes 12 described later. In the example illustrated, the shroud 31a facing the first-stage rotor vane 12a supports the downstream side of the outer peripheral side end wall 18 of the first-stage stationary vane 11a and the upstream side of the outer peripheral side end wall 18 of the second-stage stationary vane 11b. The shroud 32b facing the second-stage stationary vane 12b supports the downstream side of the outer peripheral side end wall 18b of the second-stage stationary vane 12a.

The turbine rotor 102 includes rotor disks 9a and 9b, the spacer disk 10a, and the rotor vanes 12a and 12b.

The rotor disks 9a and 9b and the spacer disk 10a are disk-shaped members aligned in the flow direction of the combustion gas 7. Hereinafter the upstream and downstream with respect to the flow direction of the combustion gas 7 will be referred to simply as "the upstream" and "the downstream." The rotor disks 9a and 9b and the spacer disk 10a are integrally fastened by stacking bolts 13. The plurality of stacking bolts 13 are provided on the circumference of a circle with the center axis 1 of the turbine 3 as a center.

The rotor disk 9a includes an inner peripheral section 21, an outer peripheral section 22, and an stacking joint section 23. While the configuration of the rotor disk 9a will be described below, the other rotor disk inclusive of the rotor disk 9b also has a similar configuration except for the presence or absence of a central hole.

The inner peripheral section 21 constitute a part on the radial directionally inner side (the center axis 1 side) of the rotor disk 9a. The inner peripheral section 21 is formed such that in a sectional surface of the rotor disk 9a cut along a plane including the center axis 1 (hereinafter, the sectional surface of the rotor disk 9a), inter-surface distance D1 becomes gradually shorter in going toward the radial directionally outer side. In the present embodiment, the "inter-surface distance" refers to the distance between surfaces on the upstream side and the downstream side of the rotor disk 9a, specifically, in the sectional surface of the rotor disk 9a, the distance between two surfaces at optional radial directional positions of the rotor disk 9a. The inner peripheral section 21 faces the spacer disk 10a provided adjacent to the downstream side of the rotor disk 9a, with a gap 28 therebetween.

The stacking joint section 23 is a section located between the inner peripheral section 21 and the outer peripheral section 22. The stacking joint section 23 is formed with a plurality of hole sections (not illustrated) in and through which the stacking bolts 13 can be inserted and passed, in the circumferential direction of the turbine rotor 102. The stacking joint section 23 has a surface on the upstream side and a surface on the downstream side, which are parallel to a plane orthogonal to the center axis 1, and these surfaces are formed such that, in the sectional surface of the rotor disk 9a, the inter-surface distance D3 is constant in the radial direction of the turbine rotor 102. A surface on the downstream side of the stacking joint section 23 is provided such as to make contact with a surface on the upstream side of the spacer disk 10 adjacent thereto (a surface on the downstream side of the stacking joint section 23 and a surface on the upstream side of a joint surface of the spacer disk 10a are in contact with each other). A plurality of rotor disks are overlapping through the spacer disks, and are fastened by the stacking bolts 13 penetrating the stacking joint section 23.

The outer peripheral section 22 constitutes a part on the radial directionally outer side of the rotor disk 9a. The outer peripheral section 22 is formed such that in the sectional surface of the rotor disk 9a, the inter-surface distance D2 is shorter than the inter-surface distance D3 of the stacking joint section 23. The outer peripheral section 22 faces the spacer disk 10a, with a gap 29 therebetween.

An annular space formed between the rotor disks 9a and 9b and the inner ring 15 and the inner peripheral wall 8b of the casing 8 and the outer ring 18 constitutes a flow channel (combustion gas flow channel) 31 through which the combustion gas 7 flows. The inner peripheral wall of the combustion gas flow channel 31 is formed by the outer peripheral surfaces of the rotor disks 9a and 9b and the outer peripheral surface of the inner ring 15, whereas the outer peripheral wall is formed by the inner peripheral wall 8a of the casing 8 and the inner peripheral surface of the outer ring 18.

The spacer disk 10a is provided between the rotor disks 9a and 9b. The spacer disk 10a includes a projection section 27 projecting from a surface (outer peripheral surface) 30 on the radial directionally outer side toward the radial directionally outer side. The projection section 27 of the spacer disk 10a cooperates with the fins of the diaphragm 14 in constituting a seal section.

The plurality rotor vanes 12a and 12b are provided on the outer peripheral surfaces of the rotor disks 9a and 9b at regular intervals along the circumferential direction of the turbine rotor 102. The rotor vanes 12a and 12b extend from the outer peripheral surfaces of the rotor disks 9a and 9b toward the radial directionally outer side (the inner peripheral wall 8a side of the casing 8). Gaps 19 and 20 are formed between outer peripheral parts (end parts on the radial directionally outer side) of the rotor vanes 12a and 12b and the shrouds 32a and 32b attached to the casing 8. The rotor vanes 12a and 12b are rotated with the center axis 1 as a center together with the rotor disks 9a and 9b and the spacer disk 10a, by the combustion gas 7 flowing through the combustion gas flow channel 31.

The rotor vanes 12a and 12b and the stationary vanes 11a and 11b are provided alternately in the flow direction of the combustion gas 7. In other words, the rotor vanes and the stationary vanes are alternately provided such that the first-stage stationary vane 11a, the first-stage rotor vane 12a, the second-stage stationary vane 11b, the second-stage rotor vane 12b . . . are present from the inlet of the combustion gas flow channel 31 toward the downstream side.

The plurality of first-stage stationary vanes 11a are provided on the upstream side of the first-stage rotor vane 12a at regular intervals in the circumferential direction of the turbine rotor 102. The first-stage stationary vanes 11a are connected to an inner periphery support section 26 provided on the upstream side of the rotor disk 9a and an outer periphery support section 25 provided to face the inner periphery support section 26 with the combustion gas flow channel 31 therebetween.

3. Design and Manufacture of Turbine

Figure 3:
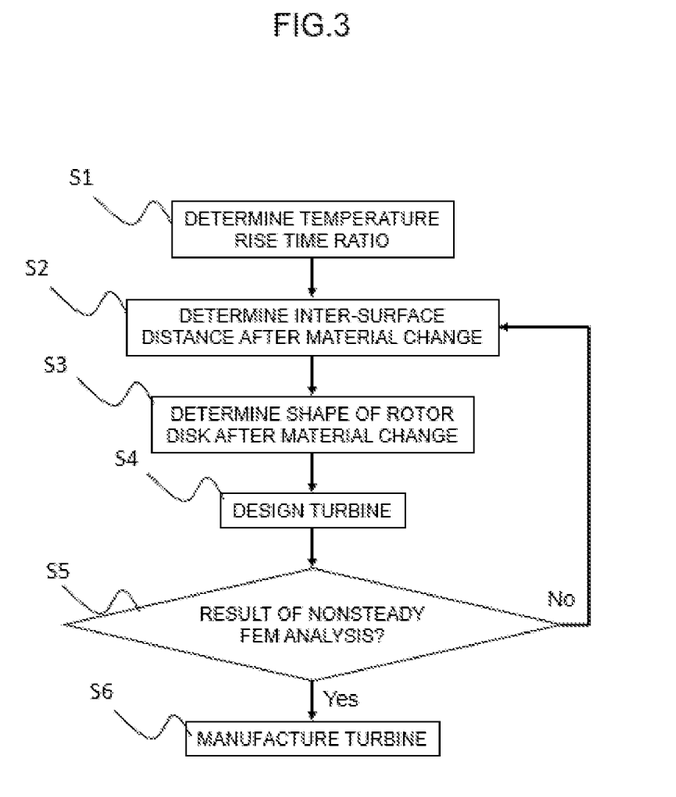
FIG. 3 is a flow chart depicting the designing and manufacturing procedure of the turbine according to the first embodiment of the present invention.

FIG. 3 is a flow chart depicting a turbine designing and manufacturing method according to the present embodiment. In the present embodiment, a turbine designing and manufacturing method attendant on material change of the rotor disk of the turbine rotor will be described by showing as an example a case of changing to a material of higher thermal resistance. Hereinafter the rotor disk 9a will be exemplified, but other rotor disk inclusive of the rotor disk 9b may be similarly configured.

Step S1

A temperature rise time ratio is determined which is a desired ratio of the temperature rise time after material change to the temperature rise time before the material change. In the present embodiment, "the temperature rise time" is the time required for the temperature of the rotor disk to reach from a first temperature to a second temperature at the time of starting of the turbine. The first temperature and the second temperature are both set temperatures; the first temperature is, for example, normal temperature (for example, 20° C.±15° C.), while the second temperature is an average temperature of an optionally selected part or each part of the rotor disk at the time of a rated operation (for example, 500° C.). While a case where the temperature rise time ratio is 1.0 is described in the present embodiment, the temperature rise time ratio may be in the range of, for example, 0.9 to 1.1. The temperature rise time will be described below.

In the present embodiment, specific heat formula and thermal conduction formula are defined as formulas (1) and (2):

$$Q = c \times m \times \Delta T \quad \text{Formula (1)}$$

where Q is the heat capacity of the rotor disk 9a, c is the specific heat of the rotor disk 9a, m is the weight of the rotor disk 9a, and $\Delta T$ is temperature variation of an optionally selected part of the rotor disk 9a.

$$Q = k \times S \times t \times (T1 - T2)/L \quad \text{Formula (2)}$$

where k is the thermal conductivity of the rotor disk 9a, S is the sectional area of a sectional surface in the case of cutting the rotor disk 9a in a plane orthogonal to the center axis 1 of the rotor disk 9a at an optional position in the direction of the center axis of the rotor disk 9a (the sectional area of an annular sectional surface with the center axis 1 of the rotor disk 9a as a center), t is the temperature rise time at an optionally selected part of a sectional surface of the rotor disk 9a, T1 and T2 are temperatures (T1>T2) of surfaces on the upstream side and the downstream side in an optional radial directional position of a sectional surface of the rotor disk 91, and L is the inter-surface distance at the optional radial directional position.

In the present embodiment, it is assumed that $\Delta T = T1 - T2$. Then, from Formulas (1) and (2), the temperature rise time t can be expressed as Formula (3).

$$t = c \times m \times L/(k \times S) \quad \text{Formula (3)}$$

When the temperature rise times before and after material change are equal, it can be said that the easiness to be warmed of the rotor disk is the same before and after the material change. When the temperature rise time after material change is shorted than that before the material change (temperature rise time ratio <1), the rotor disk is easier to warm after material change than before the material change, and when the temperature rise time after material change is longer than that before the material change (temperature rise time ratio >1), the rotor disk is more difficult to warm after material change than before the material change. Note that in the present embodiment, a method of calculating the temperature rise time t from the specific heat formula and the thermal conduction formula has been described, the method for calculating the temperature rise time t is not limited to this.

Step S2

The inter-surface distance after material change is determined on the basis of the temperature rise time ratio determined in Step S1.

From Formula (3), the temperature rise times t1 and t2 before and after material change can be expressed respectively as Formulas (4) and (5).

$$t_1 = c_1 \times m_1 \times L_1/(k_1 \times S_1) \quad \text{Formula (4)}$$

$$t_2 = c_2 \times m_2 \times L_2/(k_2 \times S_2) \quad \text{Formula (5)}$$

In the present embodiment, the temperature rise time ratio is 1.0 ($t_2/t_1 = 1.0$), and, therefore, Formula (6) is obtained from Formulas (4) and (5).

$$c_2 \times m_2 \times L_2/(k_2 \times S_2) = c_1 \times m_1 \times L_1/(k_1 \times S_1) \quad \text{Formula (6)}$$

For convenience' sake, in the present embodiment, the sectional area of the rotor disk 9a before and after material change is treated as not varying ($S_1 = S_2$), and the weight ratio ($m_2/m_1$) which is the ratio of the weight after material change to the weight before the material change and the inter-surface distance ratio ($L_2/L_1$) which is the ratio of the inter-surface distance after material change to the inter-surface distance before the material change are treated as equal. Therefore, Formula (7) is obtained from Formula (6).

$$(L_2/L_1)^2 = c_1 \times k_2/(c_2 \times k_1) \quad \text{Formula (7)}$$

In general, the specific heats $c_1$ and $c_2$ and thermal conductivities $k_1$ and $k_2$ of the rotor disk 9a before and after material change are determined by physical property values of the material. Therefore, the inter-surface distance $L_2$ after material change can be determined from Formula (7).

Step S3

The shape of the rotor disk 9a after material change is determined on the basis of the inter-surface distance determined in Step S2.

In the present embodiment, on the basis of the inter-surface distance determined in Step S2, the inter-surface distance at an optional radial directional position of the rotor disk 9a is changed, and the shape of the rotor disk 9a after the material change is determined by an equal stress disk formula. In the present embodiment, "the equal stress disk formula" refers to a formula for determining the shape of the rotor disk such that the stress acting on each of the parts of the rotor disk taking a centrifugal force into consideration will be equal independent of the radial directional position of the turbine rotor.

Figure 4:
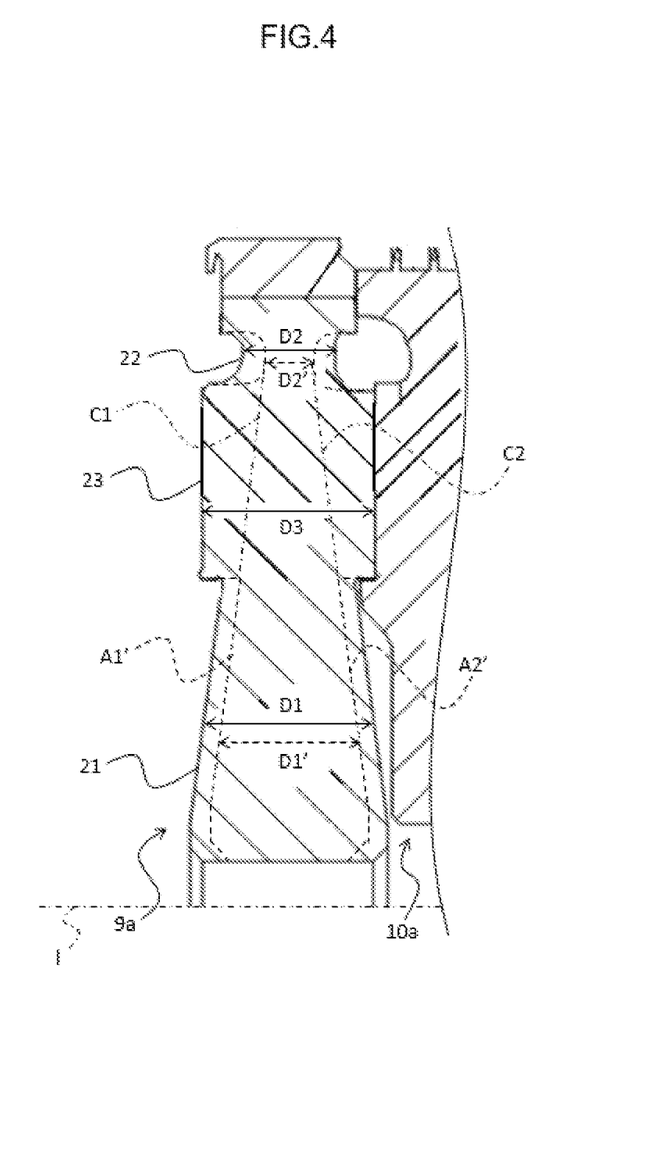
FIG. 4 is a sectional view depicting a shape of a rotor disk before and after material change.

FIG. 4 is a sectional view depicting the shapes of the rotor disk 9a before and after material change. In FIG. 4, dotted line indicates the shape of the rotor disk 9a after material change, and solid line indicates the shape of the rotor disk 9a before the material change.

As illustrated in FIG. 4, in the present embodiment, the inter-surface distances of the inner peripheral section 21 and the outer peripheral section 22 of the rotor disk 9a before material change are changed, specifically, the inter-surface distance D1 of the inner peripheral section 21 before the material change is set to D1' (<D1), and the inter-surface distance D2 of the outer peripheral section 22 is set to D2' (<D2). In FIG. 4, the inter-surface distances of the inner peripheral section 21 and the outer peripheral section 22 are uniformly changed such that the variation ratio (D1'/D1) of the inter-surface distance of the inner peripheral section 21 before and after material change and the variation ratio (D2'/D2) of the inter-surface distance of the outer peripheral section 22 are equal, and that the inter-surface distance at the outer peripheral section 22 of planes C1 and C2 (alternate long and short dash line) respectively including the surfaces A1' and A2' on the upstream side and the downstream side of the inner peripheral section 21 after the material change is equal to the inter-surface distance D2' of the outer peripheral section 22 after the material change. In other words, the surfaces on the upstream side (downstream side) of the inner peripheral section 21 and the outer peripheral section before and after material change are included in the same plane. Note that the shape of the rotor disk 9a after the material change is not limited to that in the aforementioned case. For example, the inter-surface distance of the outer peripheral section 22 after material change may be set larger than the inter-surface distance D2' of the outer peripheral section 22 in the case of uniformly changing the inter-surface distances of the inner peripheral section 21 and the outer peripheral section 22, and the inter-surface distance of the inner peripheral section 21 after material change may be set smaller than the inter-surface distance D1' of the inner peripheral section 21 in the case of uniformly changing the inter-surface distances of the inner peripheral section 21 and the outer peripheral section 22, such that the inter-surface distance at the outer peripheral section 22 when the inter-surface distance of the inner peripheral section 21 after the material change is extended to the outer peripheral section 22 is longer than the inter-surface distance of the outer peripheral section 22 after the material change. Since the outer peripheral section 22 of the rotor disk 9a is located further on the radial directionally outer side (the combustion gas flow channel 31 side) than the inner peripheral section 21, the outer peripheral section 22 is liable to be brought into a higher temperature than the inner peripheral section 21 due to transfer of heat from the combustion gas 7; however, by securing the inter-surface distance of the outer peripheral section 22 after material change to be larger (thicker), it is possible to enhance thermal resistance of the outer peripheral section 22, and to secure reliability of the turbine 3.

Step S4

The turbine 3 is designed while reflecting the shape of the rotor disk 9a determined in Step S3 on the turbine rotor 102. In the present embodiment, the turbine rotor 102 is designed, by setting the rotor disk 9a into the shape determined in Step S3, and setting the spacer disk 10a and the rotor vane 12a into the shapes before material change. The turbine 3 is designed by using the designed turbine rotor 102 and setting the constituent elements of the stationary body 101 (the casing 8, the outer peripheral side end wall 18, the stationary vanes 11b, the inner peripheral side end wall 15a, the diaphragm 14, and the like) into the shapes before material change.

Step S5

The turbine 3 designed in Step S4 is subjected to a nonsteady FEM analysis. In the present embodiment, "the nonsteady FEM analysis" is an analyzing method for virtually dividing the turbine into finite elements, and, in an environment in which temperature can be varied depending on time and position, confirming whether or not a part where a high stress exceeding a set value or the like is generated in the process of a rise in temperature at the time of starting of the turbine is present in the rotor disk 9a.

Where the result of the nonsteady FEM analysis is "Yes," control proceeds from Step S5 to Step S6. In the present embodiment, that the result of the nonsteady FEM analysis is "Yes" refers to that in the nonsteady FEM analysis, a part where a high stress exceeding a set value is generated in the process of a rise in temperature from a first temperature to a second temperature at the time of starting of the turbine is absent in the rotor disk 9a. Conversely, where the result of the nonsteady FEM analysis is "No," the control is returned to Step S2. In the present embodiment, that the result of the nonsteady FEM analysis is "No" refers to that in the nonsteady FEM analysis, a part where a high stress exceeding a set value is generated in the process of a rise in temperature from the first temperature to the second temperature at the time of starting of the turbine is present in the rotor disk 9a. Where the result of the nonsteady FEM analysis is "No," in Step S2, the inter-surface distance determined at the preceding time is adjusted (for example, the inter-surface distances of the inner peripheral section 21 and the outer peripheral section 22 are changed on the basis of the result of the nonsteady FEM analysis), to re-determine the inter-surface distance. Then, the shape of the rotor disk 9a is determined in Step S3, the turbine 3 is re-designed in Step S4, and the nonsteady FEM analysis is carried out in Step S5. Thereafter, Steps S2 to S5 are repeated until the result of the nonsteady FEM analysis becomes "Yes."

Step S6

A turbine is manufactured on the basis of the designing in Step S4. In the present embodiment, the rotor disk 9a is manufactured from the material after material change in the shape determined in Step S3, while the constituent elements of the spacer disk 10a, the rotor vane 12a, and the stationary body 101 are manufactured from the material before the material change, thereby manufacturing the turbine 3. In the case of manufacturing (remodeling) a turbine on the basis of an existing turbine, for example, the rotor disk 9a is manufactured from the material after material change in the shape determined in Step S3, while the constituent elements of the spacer disk 10a, the rotor vane 12a, and the stationary body 101 are provided by diversion of those of an existing turbine, thereby manufacturing the turbine 3.

Advantageous Effects (1) In the present embodiment, the turbine 3 is designed, by determining the temperature rise time ratio, and determining the inter-surface distances after material change on the basis of the determined temperature rise time ratio. By determining the inter-surface distances after material change on the basis of the temperature rise time ratio, it is possible to easily determined the shape of the rotor disk 9a such that the temperature rise time of the rotor disk 9a before and after the material change, or the easiness of the rotor disk 9a to be warmed, is a desired value determined by the temperature rise time ratio. Therefore, the rotor disk 9a after the material change can be made to be one of thermodynamically highly suitable design from the beginning, so that the result of the nonsteady FEM analysis is liable to be "Yes." As a result, the number of repetition of the nonsteady FEM analysis in designing a turbine 3 attendant on material change can be reduced, and, accordingly, the time required for designing and manufacturing the turbine 3 can be shortened. Particularly, in the present embodiment, since the temperature rise time ratio is set to 1.0, the easiness of the rotor disk 9a to be warmed can be equal before and after material change, and the time required for designing and manufacturing the turbine 3 can be further shortened.

(2) In the present embodiment, the shape of the rotor disk 9a after material change is determined by changing the inter-surface distances of the inner peripheral section 21 and the outer peripheral section 22 of the rotor disk 9a. Since the gaps 28 and 29 are formed between the inner peripheral section 21 and the outer peripheral section 22 of the rotor disk 9a and the spacer disk 10a, it is unnecessary to change the shape of the spacer disk 10a attendant on the change of the inter-surface distances of the inner peripheral section 21 and the outer peripheral section 22. Therefore, the labor required for designing and manufacturing the turbine 3 attendant on the material change can be lightened. In addition, the shape of the spacer disk 10a before material change can be utilized, and, accordingly, an increase in the time required for designing and manufacturing the turbine 3 attendant on material change can be suppressed.

EXAMPLE 1

Figure 5:
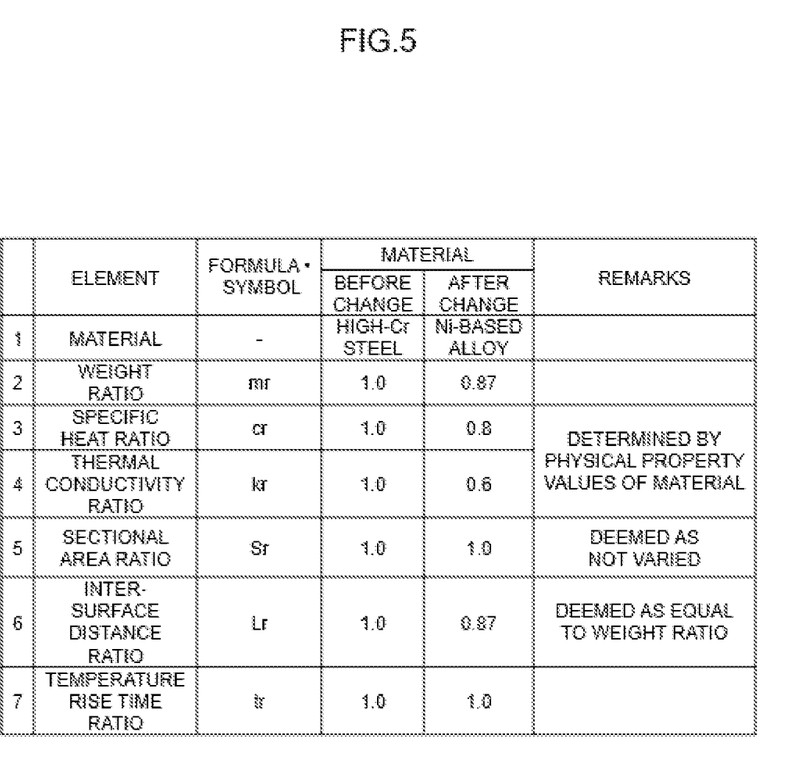
FIG. 5 is a table exemplifying the ratios of elements before and after material change of the rotor disk.

FIG. 5 is a table exemplifying the ratios of elements before and after material change of the rotor disk. In the present embodiment, a case where the material of the rotor disk 9a is changed from a high-chromium steel (high-Cr streel) to a nickel-based alloy (Ni-based alloy) is exemplified.

As depicted in FIG. 5, in the present embodiment, the specific heat ratio cr which is the ratio of the specific heat after material change to the specific heat before the material change of the rotor disk 9a is 0.8, the thermal conductivity ratio kr which is the ratio of the thermal conductivity after the material change to the thermal conductivity before the material change of the rotor disk 9a is 0.6, and the temperature rise time ratio tr is 1.0. In addition, similarly to the first embodiment, for convenience' sake, the sectional area of the rotor disk 9a is treated as not varied before and after material change (the sectional area ratio Sr which is the ratio of the sectional area after the material change to the sectional area before the material change is 1.0), and the weight ratio mr and the inter-surface distance ratio Lr of the rotor disk 9a are treated as equal.

Under the aforementioned conditions, the inter-surface distance ratio Lr is 0.87 from Formula (7)). Therefore, in the present embodiment, the shape of the rotor disk after material change is determined such that the inter-surface distance ratio Lr is 0.87, and the turbine is designed and manufactured, whereby the aforementioned advantageous effects can be obtained.

Second Embodiment

The present embodiment differs from the first embodiment in that the temperature rise time ratio is determined on the basis of the gap between turbine rotor and the casing. The other points are similar to those of the first embodiment.

In general, between the turbine rotor as a rotary body and the casing as a stationary body, a gap is provided such that the rotation of the turbine rotor is not inhibited. In order to secure a flow rate of the combustion gas that contributes to rotation of the turbine rotor, it is desirable to reduce the gap. On the other hand, at the time of starting the turbine, the turbine rotor is heated by a high-temperature combustion gas, and extends in the radial direction due to thermal expansion (thermal extension). When this thermal extension becomes larger than the aforementioned gap, the turbine rotor and the casing may make contact with each other. From the foregoing, in designing and manufacturing a turbine attendant on material change of the turbine rotor, it is desirable to take the gap between the turbine rotor and the casing into consideration.

Figure 6:
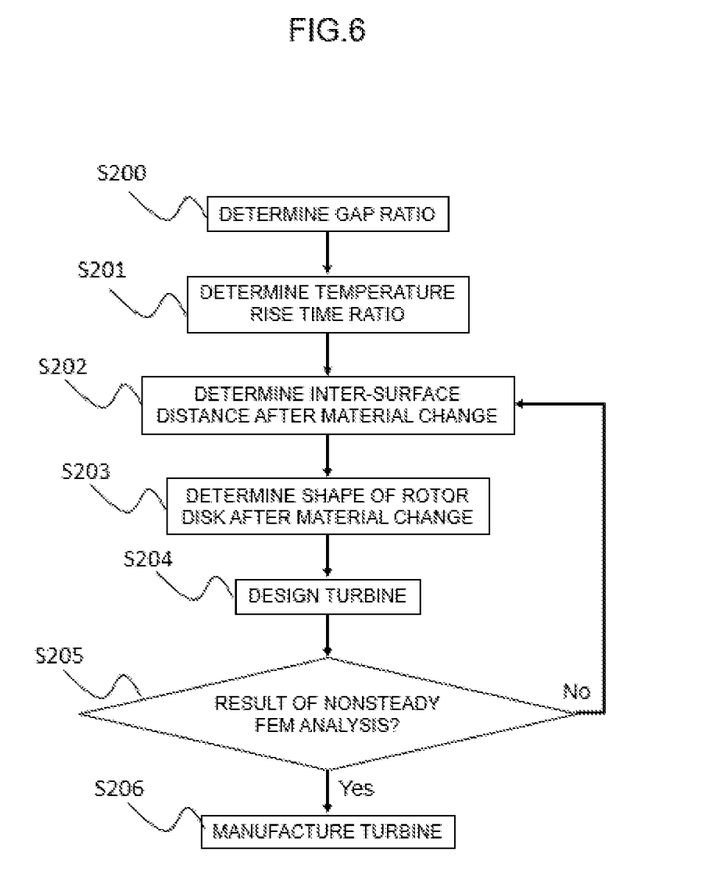
FIG. 6 is a flow chart depicting the designing and manufacturing procedure of a turbine according to a second embodiment of the present invention.

FIG. 6 is a flow chart depicting the designing and manufacturing procedure of a turbine according to the present embodiment.

Step S200

The gap ratio which is a desired ratio of the gap after material change to the gap before the material change of the rotor disk 9a at the time of starting the turbine 3 is determined. In the present embodiment, "the gap" refers to the facing distance in the radial direction between the turbine rotor 102 (rotor disk 9a) and the inner peripheral wall of the casing 8.

In the present embodiment, the gap D is defined as Formula (8):

$$D = \alpha \times t \qquad \text{Formula (8)}$$

where $\alpha$ is the linear expansion coefficient of the rotor disk 9a.

While the gap ratio is 1.0 in the present embodiment, the gap ratio may be in the range of 0.9 to 1.1.

Step S201

The temperature rise time ratio is determined on the basis of the gap ratio determined in Step S200. The procedure for determining the temperature rise time ratio based on the gap ratio will be described below.

From Formula (8), the gaps D1 and D2 before and after material changes can be expressed as Formulas (9) and (10).

$$D_1 = \alpha_1 \times t_1 \qquad \text{Formula (9)}$$

$$D_2 = \alpha_2 \times t_2 \qquad \text{Formula (10)}$$

Since the gap ratio is 1.0 ($D_2/D_1 = 1.0$) in the present embodiment, Formula (11) is obtained from Formulas (9) and (10).

$$\alpha_1 \times t_1 = \alpha_2 \times t_2 \quad \text{Formula (11)}$$

From Formula (11), the temperature rise time ratio ($t_2/t_1$) can be determined.

Steps S202 to S206

Steps S202 to S206 are similar to Steps S2 to S6 in the first embodiment. Specifically, in Step S202, the inter-surface distance after material change is determined using the temperature rise time ratio determined in Step S201. In Step S203, the shape of the rotor disk 9a after material change is determined on the basis of the inter-surface distance determined in Step S202. In Step S204, the turbine 3 is designed while reflecting the shape of the rotor disk 9a determined in Step S203 on the turbine rotor. In Step S205, the turbine 3 designed in Step S204 is subjected to a nonsteady FEM analysis. Where the result of the nonsteady FEM analysis is "Yes," control proceeds from Step S205 to Step S206. Conversely, where the result of the nonsteady FEM analysis is "No," control returns to Step S202. In Step S206, the turbine is manufactured on the basis of the designing in Step S204.

Advantageous Effects

In the present embodiment, the turbine 3 is designed by determining the gap ratio and determining the temperature rise time ratio on the basis of the determined gap radio. In the present embodiment, also, the inter-surface distance after material change is determined on the basis of the temperature rise time ratio, and, therefore, the shape of the rotor disk 9a can be easily determined such that the temperature rise time of the rotor disk 9a before and after material change, or easiness of the rotor disk 9a to be warmed, becomes a desired value determined by the temperature rise time ratio, and effects similar to those of the first embodiment are obtained. In addition, in the present embodiment, since the temperature rise time ratio is determined on the basis of the gap ratio, the shape of the rotor disk 9a can be easily determined such that the gap before and after material change becomes a desired value determined by the gap ratio. Therefore, in the turbine 3 after the material change, contact between the turbine rotor 102 and the casing 8 can be avoided, and reliability of the turbine 3 can be secured. Particularly, in the present embodiment, since the gap ratio is 1.0, the gap can be made equal before and after material change, and reliability of the turbine 3 can be further secured.

EXAMPLE 2

Figure 7:
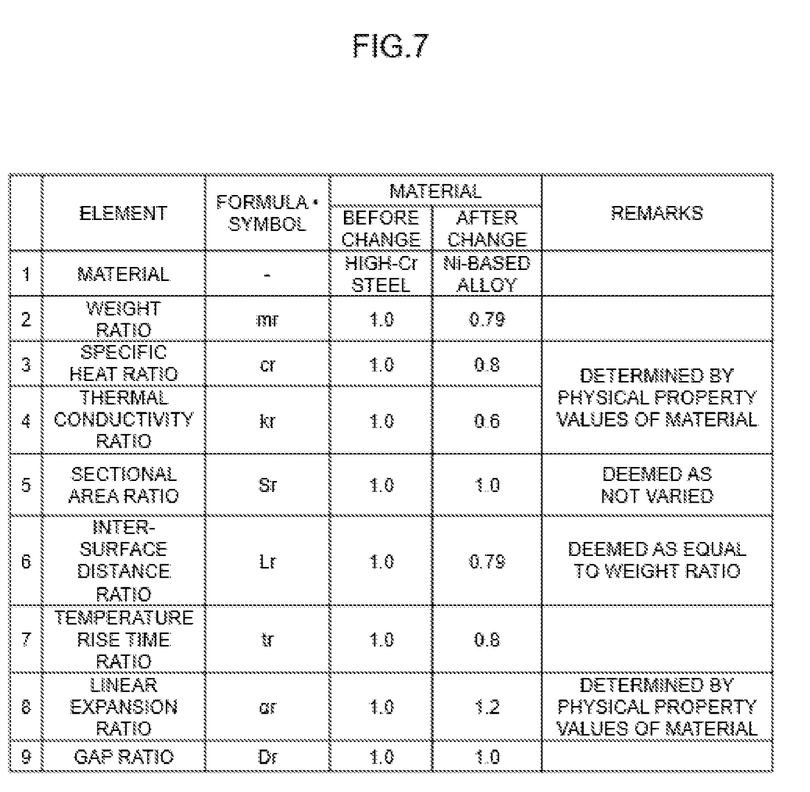
FIG. 7 is a table exemplifying the ratio of elements before and after material change of the rotor disk.

FIG. 7 is a table exemplifying the ratios of elements before and after material change of the rotor disk. The present example exemplifies the case where the material of the rotor disk 9a is changed from a high-Cr steel to a Ni-based alloy.

As depicted in FIG. 7, in the present example, the linear expansion coefficient ratio ar which is the ratio of the linear expansion coefficient after material change to the linear expansion coefficient before the material change is 1.2, and the gap ratio Dr is 1.0. Therefore, from Formula (8), the temperature rise time ratio tr is 0.8.

In the present example, the specific heat ratio cr is 0.8, and the thermal conductivity ratio kr is 0.6. In addition, in the present example, for convenience' sake, the sectional area of the rotor disk 9a is treated as not varied before and after material change, and the weight ratio mr and the inter-surface distance ratio Lr of the rotor disk 9a are treated as equal.

Under the aforementioned conditions, from Formula (7), the inter-surface distance ratio Lr is 0.79. Therefore, in the present example, by determining the shape of the rotor disk after material change is determined such that the inter-surface distance ratio Lr is 0.79, and designing and manufacturing the turbine, the aforementioned effects can be obtained.

<Others>

The present invention is not limited to the above-described embodiments, and includes various modifications. For example, the aforementioned embodiments have described in detail for easily understandably explaining the present invention, and the invention is not limited to those including all the configurations described. For example, a part of the configuration of an embodiment may be replaced by the configuration of other embodiment, or a part of the configuration of each embodiment may be eliminated.

In the aforementioned embodiments, a case where the inter-surface distance D1 of the inner peripheral section 21 before material change is set to D1' (<D1) and the inter-surface distance D2 of the outer peripheral section 22 is set to D2' (<D2) has been exemplified. However, the essential effect of the present invention is to shorten the time required for designing and manufacturing a turbine attendant on a material change, and the present invention is not limited to the aforementioned configuration, insofar as the essential effect is obtained. For example, the inter-surface distance D1 of the inner peripheral section 21 before material change may be set to D1' (<D1), and the inter-surface distance D2 of the outer peripheral section 22 may be set to D2' (>D2).

DESCRIPTION OF REFERENCE CHARACTERS

3: Turbine
9a, 9b: Rotor disk
21: Inner peripheral section
22: Outer peripheral section
23: Stacking joint section

What is claimed is:

1. A turbine designing and manufacturing method attendant on a material change of a rotor disk of a turbine rotor, wherein,
let a time required for a temperature of the rotor disk to reach from a first temperature to a second temperature at the time of starting of a turbine be temperature rise time, and let a distance between surfaces on an upstream side and a downstream side of the rotor disk be an inter-surface distance, then
a designing process comprises steps of:
determining a temperature rise time ratio that is a desired ratio of the temperature rise time after the material change to the temperature rise time before the material change;
determining the inter-surface distance after the material change on a basis of the determined temperature rise time ratio;
determining a shape of the rotor disk after the material change on a basis of the determined inter-surface distance, such that a stress acting on each of parts of the rotor disk taking a centrifugal force into consideration will be equal independent of radial directional position of the turbine rotor; and
designing the turbine while reflecting the determined shape of the rotor disk on the turbine rotor, the temperature rise time is defined by a following formula:

$$t = c \times m \times L / (k \times S)$$

where c is a specific heat of the rotor disk, m is a weight of the rotor disk, L is an inter-surface distance, k is a thermal conductivity of the rotor disk, and S is a sectional area of an annular section with a center axis of the rotor disk as a center, and a manufacturing process comprises steps of:

manufacturing the rotor disk from a material after the material change in the shape determined in the designing process, and manufacturing the turbine designed by the designing process.

2. The turbine designing and manufacturing method according to claim 1, wherein let a facing distance in a radial direction between the turbine rotor and an inner circumferential wall of a casing accommodating the turbine rotor be a gap of the rotor disk, then the temperature rise time ratio is determined on a basis of a gap ratio that is a desired ratio of the gap after the material change to the gap of the rotor disk before the material change when the temperature of the rotor disk reaches the second temperature.

3. The turbine designing and manufacturing method according to claim 2, wherein the gap is defined by a following formula:

$$D = \alpha \times t$$

where $\alpha$ is a linear expansion coefficient, and t is the temperature rise time of the rotor disk.

4. The turbine designing and manufacturing method according to claim 2, wherein the gap ratio is 1.0.

5. The turbine designing and manufacturing method according to claim 1, wherein the rotor disk has an inner circumferential part that is a part on a radial directionally inner side of the turbine rotor, an outer circumferential part that is a part on a radial directionally outer side of the turbine rotor, and a stacking joint part located between the inner circumferential part and the outer circumferential part, and the shape of the rotor disk after the material change is determined by changing the inter-surface distances of the inner circumferential part and the outer circumferential part.

6. The turbine designing and manufacturing method according to claim 1, wherein the inter-surface distances of the inner circumferential part and the outer circumferential part are changed such that the inter-surface distance of the outer circumferential part after the material change is longer than the inter-surface distance when the surfaces on the upstream side and the downstream side of the inner circumferential part after the material change are extended to the outer circumferential part.

7. The turbine designing and manufacturing method according to claim 1, wherein the temperature rise time ratio is 1.0.

* * * * *